United States Patent

Nonnenmann

[11] 3,914,068

[45] Oct. 21, 1975

[54] FAN FOR MOTOR VEHICLES

[75] Inventor: Manfred Nonnenmann, Schwieberdingen, Germany

[73] Assignee: Suddeutsche Kuhlerfabrik, Stuttgart, Germany

[22] Filed: Jan. 16, 1973

[21] Appl. No.: 324,118

[30] Foreign Application Priority Data
Jan. 25, 1972 Germany............................ 2203353

[52] U.S. Cl................................ 416/132; 416/240
[51] Int. Cl.² .......................................... F04D 29/38
[58] Field of Search ........ 416/132, 240, 241 A, 226

[56] References Cited
UNITED STATES PATENTS

| | | | |
|---|---|---|---|
| 612,511 | 10/1898 | Beck | 416/226 |
| 958,599 | 5/1910 | Cooksey | 416/240 |
| 1,313,598 | 8/1919 | Ingells | 416/240 |
| 1,378,113 | 5/1921 | Hewitt | 416/226 |
| 1,798,299 | 3/1931 | Antoni | 416/240 |
| 2,116,055 | 5/1938 | Weichwald | 416/223 |
| 2,570,862 | 10/1951 | Rosenkrans et al | 416/132 UX |
| 3,275,082 | 9/1966 | Stark | 416/132 UX |
| 3,584,969 | 6/1971 | Aiki et al | 416/132 |
| 3,751,181 | 8/1973 | Hayashi | 416/132 |
| 3,822,103 | 7/1974 | Hori et al | 416/240 X |

FOREIGN PATENTS OR APPLICATIONS

| | | | |
|---|---|---|---|
| 411,904 | 6/1910 | France | 416/132 A |
| 2,013,481 | 10/1970 | Germany | 416/132 |
| 735,817 | 9/1932 | France | 416/240 |
| 4,560 | 1910 | United Kingdom | 416/132 |
| 8,290 | 1910 | United Kingdom | 416/240 |
| 614,074 | 12/1948 | United Kingdom | 416/240 |

Primary Examiner—Everette A. Powell, Jr.
Attorney, Agent, or Firm—Browdy and Neimark

[57] ABSTRACT

A fan, particularly for use in motor vehicles which has a hub and a plurality of radially deployed blades is disclosed. The blades, made of flexible plastic or spring steel, have a pitch angle at the tips greater than that at the roots. Furthermore, the chords of the blades are wider at the tips than at the roots. The blades may also be thicker at the radial center thereof than at other parts of the blades.

2 Claims, 3 Drawing Figures

FAN FOR MOTOR VEHICLES

FIELD OF THE INVENTION

The present invention concerns a fan, consisting of a hub and a plurality of radially deployed blades connected to said hub, said blades being made of flexible plastic or spring steel, especially for motor vehicles. More particularly the present invention relates to a fan having blades which have a greater pitch angle and may also be wider at the tips than at the roots.

BACKGROUND OF THE INVENTION

Relatively large air volumes are required at low rpm values, especially for cooling motor vehicles by means of propeller blowers or the like which are driven directly by the motor vehicle. An appropriate fan must be designed for the air volumes required at low rpm values. At higher rpm values, however, too much air is supplied, and the increased power loss and loud fan noise become disadvantageous.

To overcome these disadvantages, it has already been proposed to change the pitch of the fan blades as a function of the speed by twisting the blades by means of centrifugal force. Thus, a propeller blower is known in which the blades are linked to the hub by radial tension members that produce the twisting, and the angular displacement of the fan blades is produced by centrifugal weights that are movable with respect to the fan blades. The design cost and hence the construction cost for this solution are extraordinarily high.

In another known fan arrangement, which works in conjunction with the radiator of a motor vehicle, and in which the hub and blades are made of synthetic resin material or only the blades are made of flexible material (plastic or spring steel), a notch is provided in the area of the root of each blade and in the rearward portion with respect to the direction of rotation.

Heretofore the development of fans, especially plastic fans, has largely stressed making the blades in accordance with aerodynamic laws and achieving axial airflow velocities that were as equal as possible over the entire cross section of the fan. These conditions apply only to a very limited extent in the case of installations in motor vehicles, however, since the engine of the vehicle, which drives the fan, blocks the airstream coming from the fan to a very large extent. For this reason, axial flow (at least in the area of the fan hub) in many cases is not possible or is seriously impeded.

SUMMARY OF THE INVENTION

The object of the invention is to make a fan that delivers the full air volume at low rpm values, but reduces the delivery and pressure at high rpm levels to cut power losses.

This object is achieved according to the invention mainly by having, in a fan of the type described above, blades which have a greater pitch angle at the blade tips than at the blade roots.

This results in blade deformation to give smaller blade pitch angles when the fan rpm is increased, in contrast to a rigid blade arrangement, the air volume, pressure and power of which drop off and the air delivery decreases with increasing fan rpm.

According to an advantageous refinement of the invention, the blade chord is larger at the blade tip than at the root.

By having a larger blade chord at the tip than at the root, the portions of the blade located at the tip acquire a moment (because of the centrifugal force) which likewise tends to reduce the pitch angle of the blades. The increased blade chord at the tip therefore has an effect similar to the negative twist according to the invention. Both effects exist side by side and independently. The effects are superimposed in the case of joint application.

An additional advantage of the negative twist according to the invention follows from the fact that the axial flow rate of the air at the blade tip is greater than at the hub. This means that in instances where the motor is located behind the fan there will be good flow conditions for the air and hence reduced pressure losses and less power loss for the fan.

The material strength of the fan blades is advantageously selected so that a higher material strength is provided in the area of the neutral axis which does not participate in the torsion, in order to take up the centrifugal forces; outside this neutral zone, however, the fan blades are made of thin material.

BRIEF DESCRIPTION OF THE DRAWING

Further features and advantages of the invention can be seen from the drawing, which shows sample embodiments in schematic form.

DESCRIPTION OF THE PREFERRED EMBODIMENTS

Figure 1:
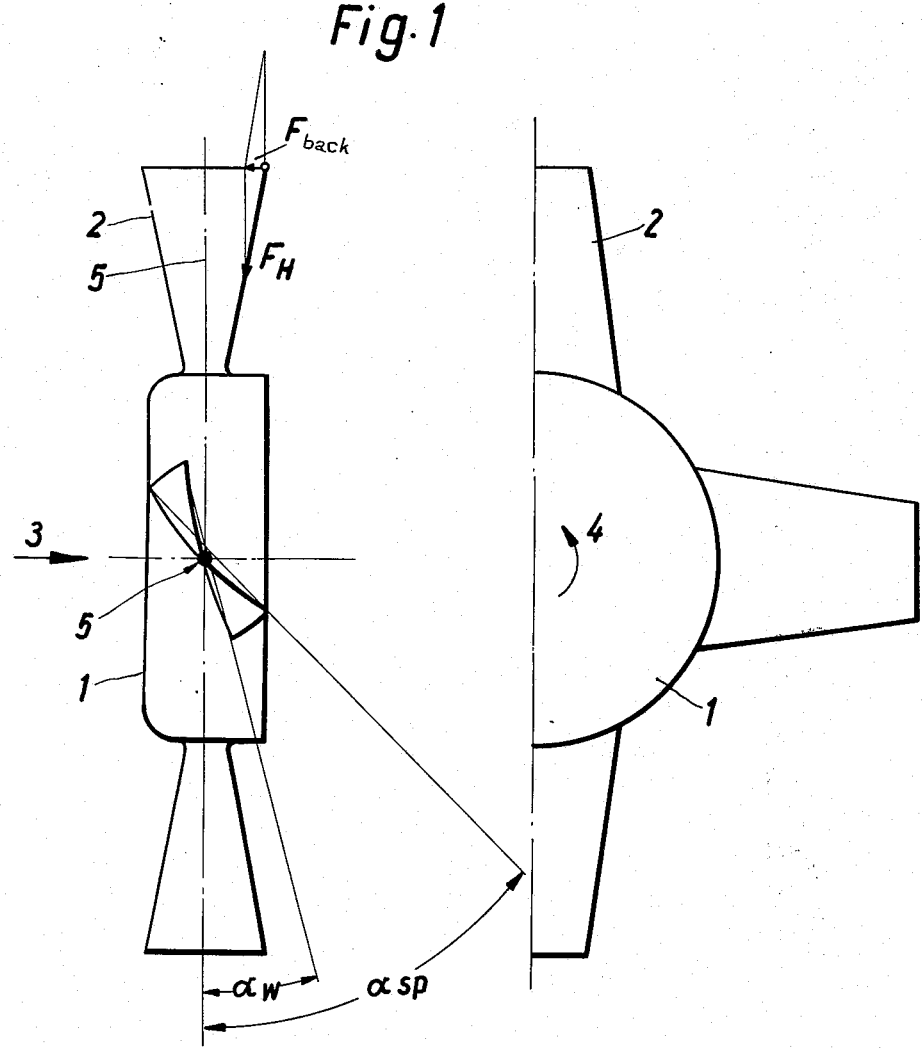
FIG. 1: An initial sample embodiment in side view and partial front view.

As can be seen from the drawing, a fan according to the invention consists of a fan hub 1 and fan blades 2. The direction of air flow is indicated by arrow 3, while the direction of rotation of the fan is shown by arrow 4. The neutral axis of the fan blade is indicated by 5, on which lie all the portions of the fan blade that are located on a radius which is perpendicular to the axis of rotation and passes through the root and tip of the blade.

According to the invention, the blade angle or pitch angle $\alpha_{sp}$ at the blade tip is greater than the pitch angle $\alpha_w$ at the blade root. The blade angle is understood to be the angle formed between the chord across the curve of the blade and a corresponding plane normal to the hub axis.

All portions that do not lie on the neutral axis are subject to the torque $F_{back}$ which, as the parallelogram of forces in FIG. 1 shows, is generated by the centrifugal force Z and the cohesion $F_H$ and is therefore a function of the rpm value.

The elasticity of the material of which the fan blades 2 are made, for example flexible plastic or spring steel, will cause a twisting of the blade tips under the influence of force $F_{back}$ as the rpm rises, in such a way that the blade angle $\alpha_{sp}$ decreases and the volume of air supplied decreases as well, resulting in corresponding drops in power consumption and noise.

Figure 2:
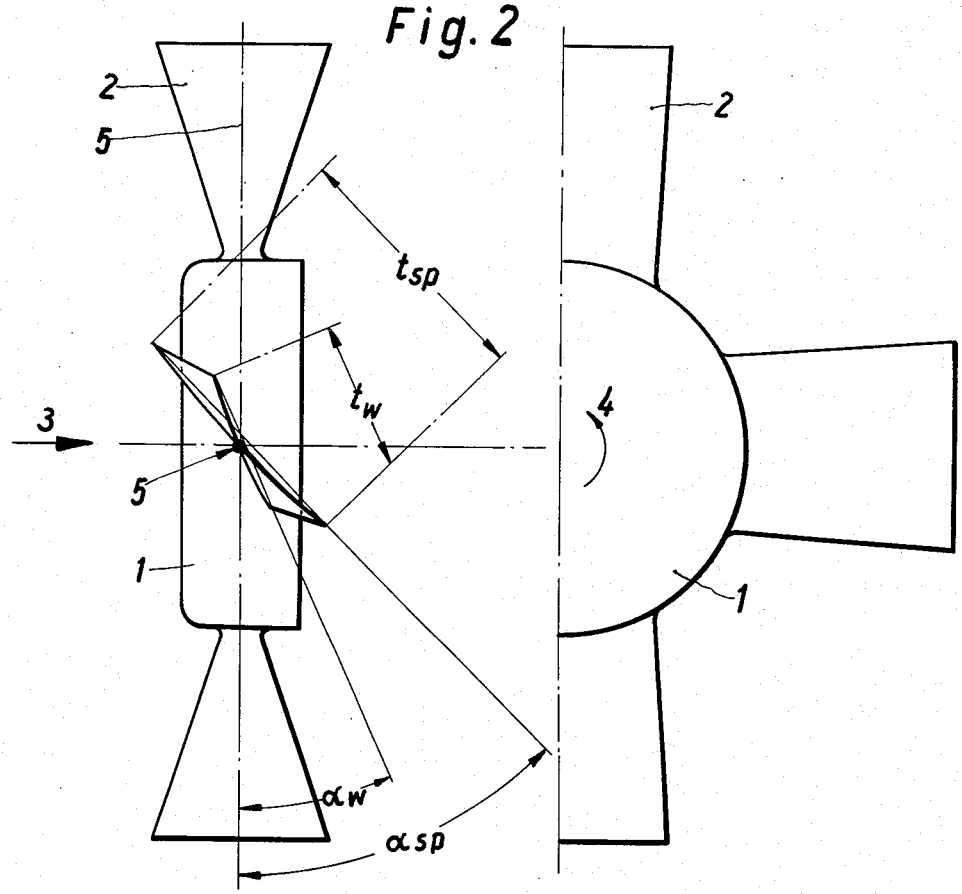
FIG. 2: A second sample embodiment in side view and partial front view.

In the second sample embodiment of the invention shown in FIG. 2, in addition to the larger pitch angle of the blade at the blade tip, the blade chord $t_{sp}$ at the tip is made larger than the blade chord $t_w$ at the blade root.

This results in an intensification of the effect described above. Under the influence of the centrifugal forces, all portions of the blade except the neutral axis develop a moment that tends to reduce the existing pitch angle.

Through the dependence of the pitch angle upon the rpm, the desired dependence of the delivered volume and the total pressure upon the rpm is achieved.

Figure 3:
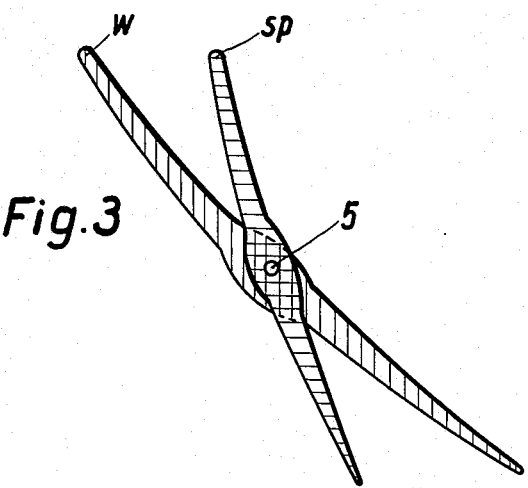
FIG. 3: A third sample embodiment of the invention with sections through the blade root and tip.

FIG. 3 shows a third sample embodiment of the invention, in which a greater material thickness is provided in the area of the neutral axis 5 which does not participate in the twisting caused by centrifugal forces, said thickness giving the fan blade the necessary strength to withstand centrifugal forces and those generated by the wind. The parts of the fan blades located outside this neutral zone are made of thinner material and therefore are particularly flexible with respect to twisting.

The invention is not limited to the sample embodiments described and shown. It also includes all partial and sub-combinations of its features.

The fan blades may be permanently or removably attached to the fan hub. The fan can also be made in one piece, however.

It will be obvious to those skilled in the art that various changes may be made without departing from the scope of the invention and the invention is not to be considered limited to what is shown in the drawings and described in the specification.

What is claimed is:

1. In a fan for motor vehicles consisting of a hub and a plurality of radially deployed blades attached to the hub, said blades being made of flexible material and having a neutral axis, the improvement wherein the pitch angle of the blades is greater at the blade tips than the pitch angle at the blade roots and the thickness of the fan blades in the area of the neutral axis is greater than in the other parts of the blades, and wherein said neutral axis extends radially outwardly and perpendicular to the axis of rotation of the fan and along substantially the center line of the blade.

2. A fan in accordance with claim 1 wherein the chord of the blades is longer at the tips than at the roots.

* * * * *